(12) United States Patent
Head et al.

(10) Patent No.: US 10,199,897 B2
(45) Date of Patent: Feb. 5, 2019

(54) VERY HIGH TEMPERATURE STATOR CONSTRUCTION

(71) Applicant: COREteQ Systems Ltd., Bagshot (GB)

(72) Inventors: Philip Head, Virginia Water (GB); Hassan Mansir, Maidenhead (GB)

(73) Assignee: Coreteq Systems Ltd., Surrey (GB)

( * ) Notice: Subject to any disclaimer, the term of this patent is extended or adjusted under 35 U.S.C. 154(b) by 107 days.

(21) Appl. No.: 15/036,121

(22) PCT Filed: Nov. 17, 2014

(86) PCT No.: PCT/EP2014/074795
§ 371 (c)(1),
(2) Date: May 12, 2016

(87) PCT Pub. No.: WO2015/071465
PCT Pub. Date: May 21, 2015

(65) Prior Publication Data
US 2016/0301275 A1    Oct. 13, 2016

(30) Foreign Application Priority Data
Nov. 15, 2013  (GB) .................................. 1320242.9

(51) Int. Cl.
*H02K 3/34* (2006.01)
*H02K 3/38* (2006.01)
*H02K 1/04* (2006.01)

(52) U.S. Cl.
CPC .............. *H02K 3/345* (2013.01); *H02K 1/04* (2013.01); *H02K 3/38* (2013.01); *H02K 2203/09* (2013.01)

(58) Field of Classification Search
CPC ............ H02K 3/345; H02K 3/38; H02K 1/04; H02K 3/34; H02K 2203/09
(Continued)

(56) References Cited

U.S. PATENT DOCUMENTS

| 1,469,304 A | 10/1923 | Hughes |
| 1,960,484 A | 5/1934 | Ekstromer |

(Continued)

FOREIGN PATENT DOCUMENTS

| CN | 101227127 A1 | 7/2008 |
| CN | 101873043 A | 10/2010 |

(Continued)

OTHER PUBLICATIONS

G2 Consult: "Theory & Practice of Electromagnetic Design of DC Motors & Actuators", Internet, Nov. 16, 2012, retrieved from the Internet Jan. 22, 2016: URL: https://web.archive.org/web/20120116070129/http://www.consult-g2.com/course/chapter8/chapter.html ; 5 pgs.

(Continued)

*Primary Examiner* — Naishadh Desai
(74) *Attorney, Agent, or Firm* — Fay Sharpe LLP

(57) ABSTRACT

A stator has a field winding, the winding comprising a plurality of axial conductors connected at their ends to form at least one circuit with a number of turns. Each axial conductor is disposed within a tubular axial insulation member, the tubular axial insulation members being disposed within a stack of laminations. The axial conductors and the tubular insulation members are radially distributed at equal angles. The position of the axial conductors and the tubular insulation members is predetermined.

19 Claims, 10 Drawing Sheets

(58) Field of Classification Search
USPC .................................................. 310/179–210
See application file for complete search history.

(56) References Cited

U.S. PATENT DOCUMENTS

| | | | |
|---|---|---|---|
| 2,240,569 A | 5/1941 | Myers | |
| 4,247,978 A * | 2/1981 | Smith | H02K 3/345 29/596 |
| 5,682,074 A * | 10/1997 | Di Pietro | B22D 19/0054 310/211 |
| 2002/0066568 A1 | 6/2002 | Buchanan | |
| 2002/0079763 A1 | 6/2002 | Fleshman et al. | |
| 2009/0184598 A1 | 7/2009 | Nakano | |
| 2009/0322178 A1 * | 12/2009 | Dobashi | H02K 15/0037 310/195 |
| 2011/0198962 A1 * | 8/2011 | Tang | H02K 3/28 310/198 |
| 2011/0316468 A1 | 12/2011 | Makki et al. | |
| 2012/0228989 A1 * | 9/2012 | Okimitsu | H02K 3/12 310/260 |
| 2013/0076171 A1 * | 3/2013 | Lepres | H02K 1/20 310/59 |
| 2013/0313921 A1 * | 11/2013 | Hoffman | H02K 1/185 310/43 |
| 2014/0035424 A1 * | 2/2014 | Shibuya | H02K 3/32 310/198 |
| 2014/0077635 A1 * | 3/2014 | Hossain | H02K 5/20 310/64 |
| 2014/0354095 A1 * | 12/2014 | Ishikawa | H02K 3/12 310/71 |
| 2016/0047205 A1 * | 2/2016 | Head | E21B 4/006 166/66.4 |

FOREIGN PATENT DOCUMENTS

| | | | |
|---|---|---|---|
| DE | 102011120985 A1 | 6/2013 | |
| EP | 2112748 A1 | 10/2009 | |
| EP | 2573908 A2 | 3/2013 | |
| GB | 2438493 A | 11/2007 | |
| GB | 2501352 A | 10/2013 | |
| JP | S57186966 A | 11/1982 | |
| JP | H05 22916 A | 1/1993 | |
| JP | H11 299144 A | 10/1999 | |
| JP | 2009095193 A | 4/2009 | |
| WO | WO2004027211 A1 | 4/2004 | |
| WO | WO2015/071468 A3 | 5/2015 | |
| WO | WO 2015071465 A1 * | 5/2015 | H02K 3/345 |
| WO | WO2015071466 A2 | 5/2015 | |
| WO | WO2015071469 A2 | 5/2015 | |
| WO | WO2015071470 A1 | 5/2015 | |

OTHER PUBLICATIONS

International Search Report and Written Opinion, PCT/EP2014/074795, Completed Feb. 19, 2015, dated Mar. 4, 2015, 10 pages.

* cited by examiner

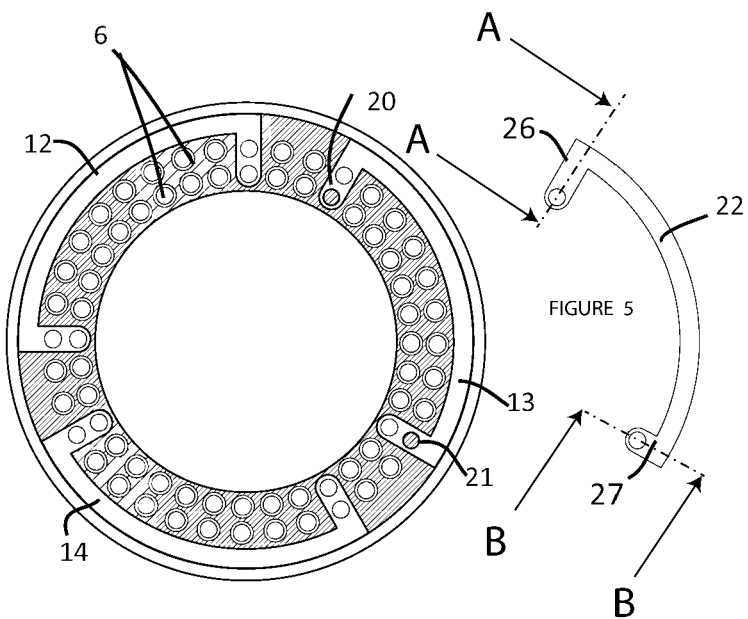
FIGURE 4
FIGURE 5
FIGURE 6 - Section AA
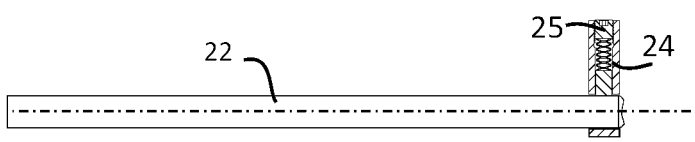
FIGURE 7 - Section BB

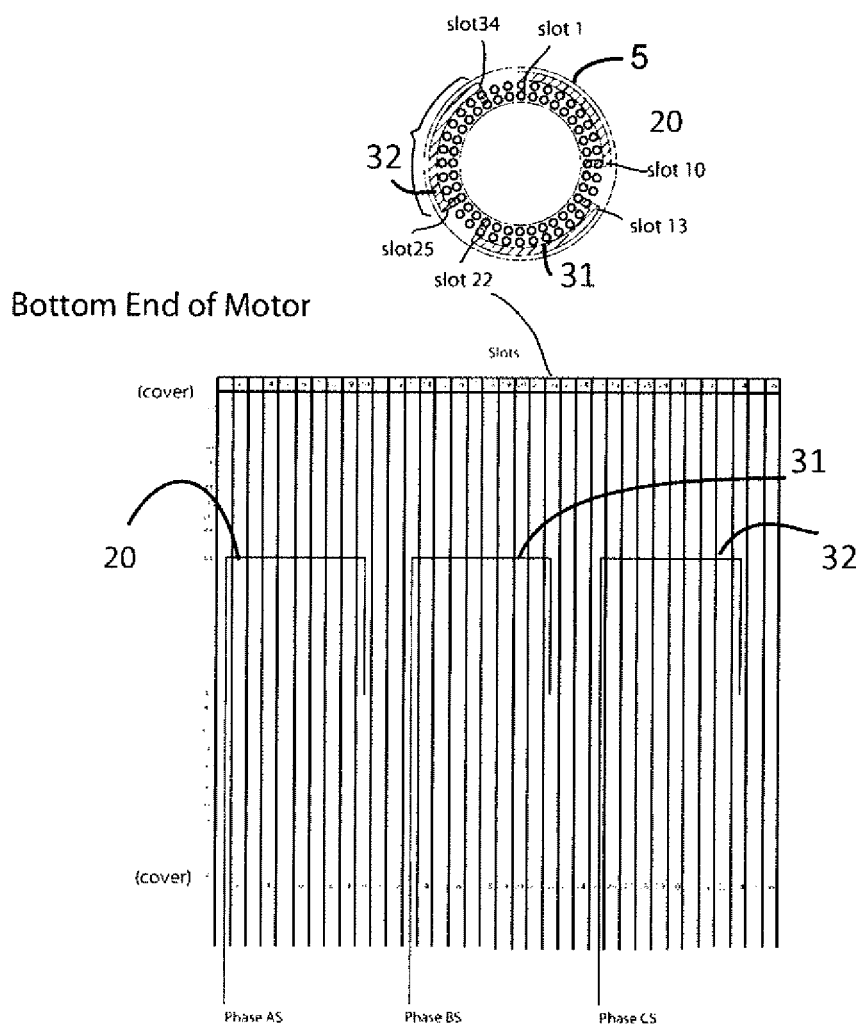

VERY HIGH TEMPERATURE STATOR CONSTRUCTION

At present, electrical machines comprise one or more electrical conductor windings each of which has a polymeric insulation material. These electrical machines have a maximum operating temperature of the order of 200 C due to the polymeric insulation material applied to the electrical conductor windings.

The use of high temperature polymeric insulation material would enable the electrical machines to have a maximum operating temperature of the order of 250 C. However, it is believed that stable, oxidation resistant, polymeric insulation material will not have a maximum operating temperature above 300 C.

There is a requirement for electrical machines with maximum temperatures of 400 to 500° C. and above. These electrical machines for example are active electromagnetic bearings, electrical generators and electrical motors for use within gas turbine engines, particularly on the high-pressure shaft rotor of a gas turbine engine, in oil and gas wells, particularly in steam assisted gravity drainage (SAGD) type heavy oil wells. The use of active electromagnetic bearings may allow the simplification of the rotating machinery by the elimination of conventional bearings and oil systems.

As discussed above, polymeric insulation material cannot be used at temperatures above about 300 C. The use of an inorganic insulation material for the electrical conductors is a possibility. The inorganic insulation material may be based on ceramic cloths or ceramic coatings, applied to the electrical conductors. However, this is not desirable because the inorganic insulation material tends to be bulky limiting the packing density of the electrical conductor and the electrical conductors require potting in an inorganic cement, in addition the manufacturing process is very labour intensive. The use of an inorganic insulation material may be based on ceramic cloth and inorganic cement. However, this is not desirable because these inorganic insulation materials have poor thermal conductivity and would make the thermal management of the electrical conductor difficult. Additionally the porous nature of the inorganic cement tends to allow the inorganic insulation material to soak up fluids, for example water, oil or other lubricant. The presence of moisture tends to degrade the electrical insulation by allowing leakage currents to earth or between turns of the electrical conductor. The presence of oil tends to degrade the electrical insulation by forming carbon also allowing leakage currents to earth or between turns of the electrical conductor. Also the thermal expansion mismatch may cause damage to the insulation material during thermal cycling of the electrical conductor.

SUMMARY OF THE INVENTION

It is an object of the present invention is to provide a motor winding that can operate at or withstand high temperatures.

According to an aspect of the present invention, there is provided a stator having a field winding, the winding comprising a plurality of axial conductors connected at their ends to form at least one circuit with a number of turns, each axial conductor being disposed within a tubular axial insulation member, the tubular axial insulation members being disposed within a stack of laminations.

According to another aspect of the present invention, there is provided a stator having a field winding, the winding comprising a plurality of axial conductors connected at their ends to form at least one circuit with a number of turns, the axial conductors being joined in pairs by a connection at their ends to form at least one circuit with a number of turns, the connection between pairs of the axial conductors being provided by a plurality of discs formed of insulating material, each disc having conductive end turn path provided to connect one or more pairs of axial conductors.

According to another aspect of the present invention, there is provided a stator having a field winding, the winding comprising a plurality of axial conductors connected at their ends to form at least one circuit with a number of turns, the axial conductors being joined in pairs by a connection at their ends to form at least one circuit with a number of turns, the connection between pairs of the axial conductors being provided by shaped conductor members, with potting material being provided around the shaped conductor members.

One aspect of the invention is to provide ceramic or other insulating material for the copper conductor in lamination slots. For example, the ceramic may be provided as a tube through which each copper conductor is threaded. A second aspect is providing ceramic (or other insulating) material for the end turns, for example using stackable wafers which sandwich the copper conductor. In order to enable the copper to bend at the end turn yet not crack the insulation, at each end turn the ceramic tube or sandwich may be terminated and a ceramic lamination used to isolate the copper conductor to enable it to be "turned" to the next slot and then threaded or laid into the ceramic insulated slot. Once the machine is fully wound, the free space around the conductors and ceramic laminations may be filled with magnesium oxide insulation, in either case the windings are ideally hermitically sealed.

BRIEF DESCRIPTION OF DRAWINGS

The present invention will be more fully described by way of example with reference to the accompanying drawings in which:

FIG. 4 is an end view of the wafer
FIG. 5 is an end turn link shown in FIG. 4
FIG. 6 is a section side view AA of FIG. 5
FIG. 7 is a section view BB of FIG. 5
FIG. 8 is a slot winding diagram
FIG. 9 is the end view of the layer AA of the winding diagram shown in FIG. 8.

DETAILED DESCRIPTION OF INVENTION

Figure 1:
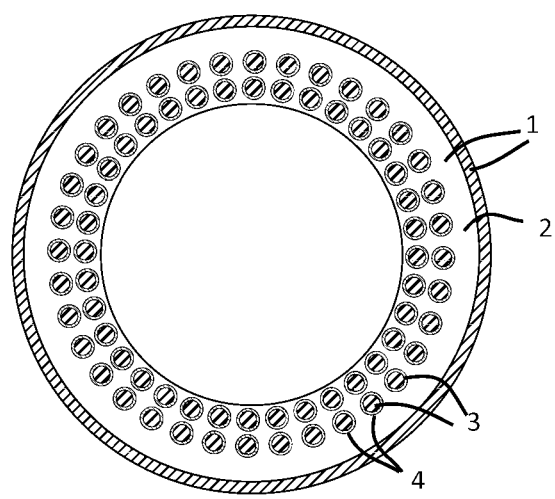
FIG. 1 section end view through the stator
FIG. 2. is an isometric view of a ceramic end turn wafer

Referring to FIG. 1, mid-section of the stator comprises a steel tube housing 1, installed inside the housing are a number of laminations 2, the number will determine the length of the motor. The lamination 2 has holes or slots for the motor windings 3, each hole has a ceramic tube 4 which provides electrical insulation for the motor winding wire 3. The number of laminations and their thickness determines the length of the active portion of the stator. The slots and the conductors for the motor windings 3 are arranged in two concentric circles, the slots and conductors being equally distributed around each radius.

Figure 2:
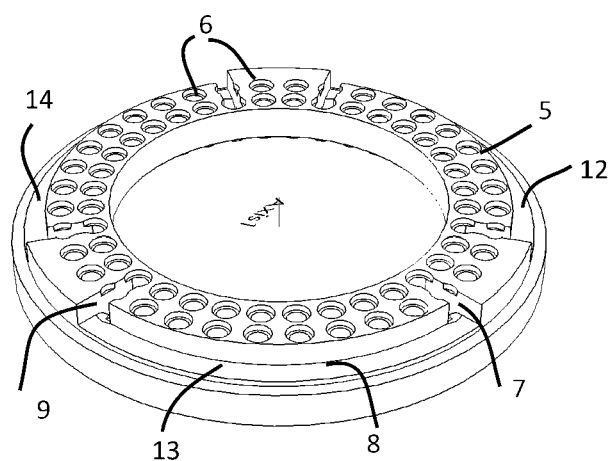
Figure 3:
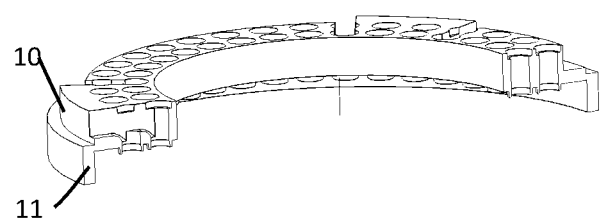
FIG. 3 is a half section of the wafer shown in FIG. 2

Each length of winding must of course be electrically connected to the other windings to provide a winding path having a number of turns. For this stator, a stack of wafers 5 are used at each end of the stack of laminations 2. Referring to FIGS. 2 and 3, a ceramic wafer 5, has a corresponding number of holes or slots 6 to match the holes or slots in the lamination 2. To complete an end turn, the motor winding wire 3 passes through the passage 7, along the curved channel 8 and back into the lamination stack via passage 9. The conductors which form the windings (and the end turns if separate) may be copper, or copper clad steel.

The wafers 5 can be stacked one on top of the other, the rim of each wafer having a stepped profile so that a raised boss 10 on the underside of the wafer fits into a recesses 11 of the upper face of the subsequent wafer. On each wafer there are three passage 12, 13 and 14 which correspond to each electrical phase of the motor.

The wire forming the conductive path may be continuous, or it may be terminated at motor end turn wafer and electrically and mechanically joined to the next wire. Referring to FIGS. 4 to 7, as the wire 20 exits the wafer it is connected to wire 21 (the return wire) through the lamination stack by a conductive link piece 22, which is generally curved, and has two inwardly radially extending arms 26, 27. As previously mentioned, the slots 6 are distributed around the ceramic wafer in two concentric circles. The wire 20 is located in a slot 6 on the inner concentric circle, while the wire 21 is located in a slot 6 on the outer concentric circle. The length of arms 26, 27 of link piece are sized appropriately.

Link piece 22 may be formed of copper, or copper clad steel for example. The link piece may be connected to the wires 20, 21 by an interference fit into the channel 13 of the ceramic wafer, or referring to FIGS. 6 and 7 an ultrasonic friction welded, or mechanically connected using a connection element 29, which may include a grub screw 25 and stack of Bellville washers 24, which apply uniform pressure even at elevated temperatures.

Each end of the axial conductors running through the laminations can be connected to the link bar using friction welding, enabling extra thick ceramic insulation to be bonded to the outside of the copper wire.

Referring to FIGS. 8 and 9 there is shown the motor circuit diagram together with corresponding views of one of the bottom end turn ceramic wafers 5. For efficient packing, all three phases are wired at the simultaneously. The end turn of each phase consists of a U shaped wire, i.e. for phase A the U shaped wire 20 passes through slots 1 and 10, while similar wires 31, 33 pass through slots 13 and 22, and 25 to 34 respectively, using link pieces 22 as previously described.

Figure 10:
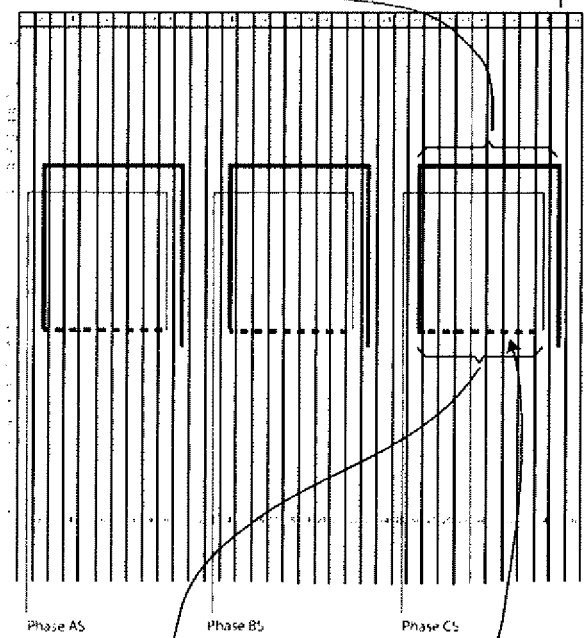
FIG. 10 is the slot winding diagram showing the next winding circuit
Figure 11:
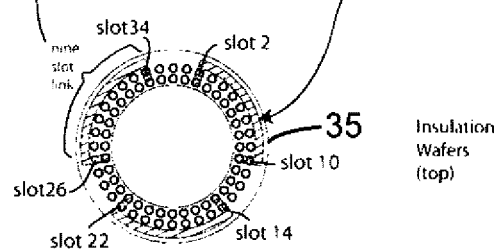
FIG. 11 is the end view of the layer BB of the winding diagram shown in FIG. 10.

Referring to FIGS. 10 and 11, when the conductor in slot 10 reaches the top end of the motor, another ceramic end turn wafer 35 is added to the lamination stack, and the conductor is joined using a link pieces to another conductor in slot 2. Similarly, the conductors of slots 22 and 34 are joined to conductors in slots 14 and 26 respectively.

Figure 12:
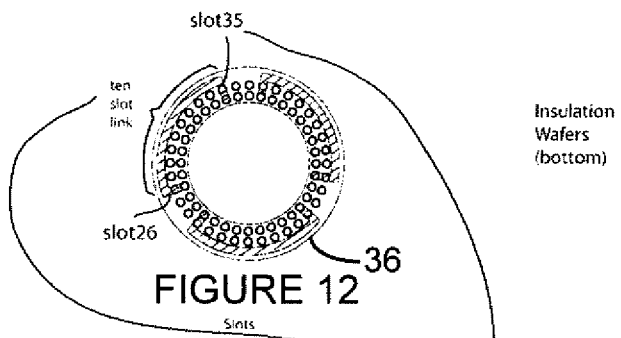
FIG. 12 is the end view of the layer A of the winding diagram shown in FIG. 10.

Referring to FIGS. 10 and 12, when the conductor in slot 2 reaches the bottom end of the motor, another ceramic end turn wafer 36 is added to the previous ceramic end turn wafer 5, and the conductor is joined using a link pieces to another conductor in slot 11. The conductors in slots 14 and 26 are joined to conductors in slots 23 and 35 respectively.

Figure 13:
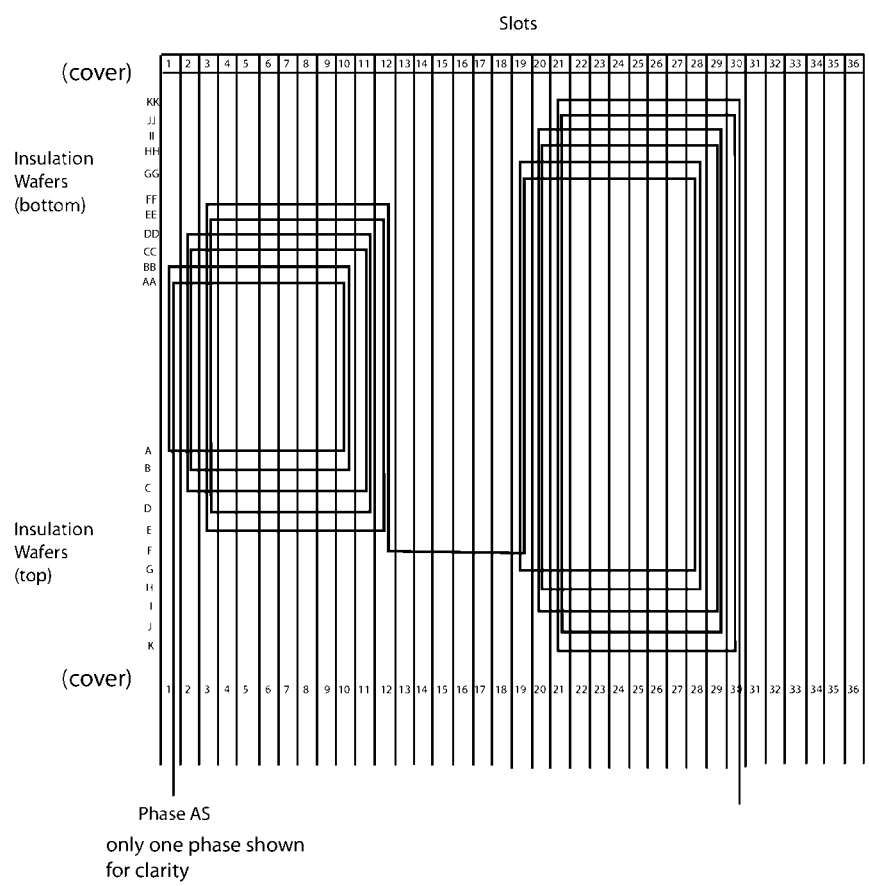
FIG. 13 is the slot winding diagram showing the complete circuit for phase A

Referring to FIG. 13, which shows the wiring diagram for a single phase, this process is repeated until the conductor of every slot is joined as part of a winding circuit, in this case using three separate circuits to employ a three-phase power supply.

In this embodiment, the slots are arranged in two concentric circles, each circle having 36 slots distributed equally around the radius. Each ceramic end turn wafer joins three conductor pairs (one pair for each phase circuit). In order to connect the 72 longitudinal connectors together, 11 ceramic end turn wafer A to K are required at the top of the stator where the power is connected, and 12 ceramic end turn wafer AA to LL are required at the bottom of the stator. As shown in the diagrams, a conductor from the outer concentric circle of conductors will generally be connected to a conductor from the inner concentric circle of conductors.

Other wiring configurations will be possible, with the number and layout of slots, and in particular the arrangement of connections and length of ceramic link pieces being varied to suit the winding arrangements. The use of the link pieces with the end turn ceramic wafers, as well as the use of ceramic tubes through the active part of the stator laminations, enables the wire to be completely encased in a ceramic insulation, each wire fully isolated from every other wire in the motor.

Figure 14:
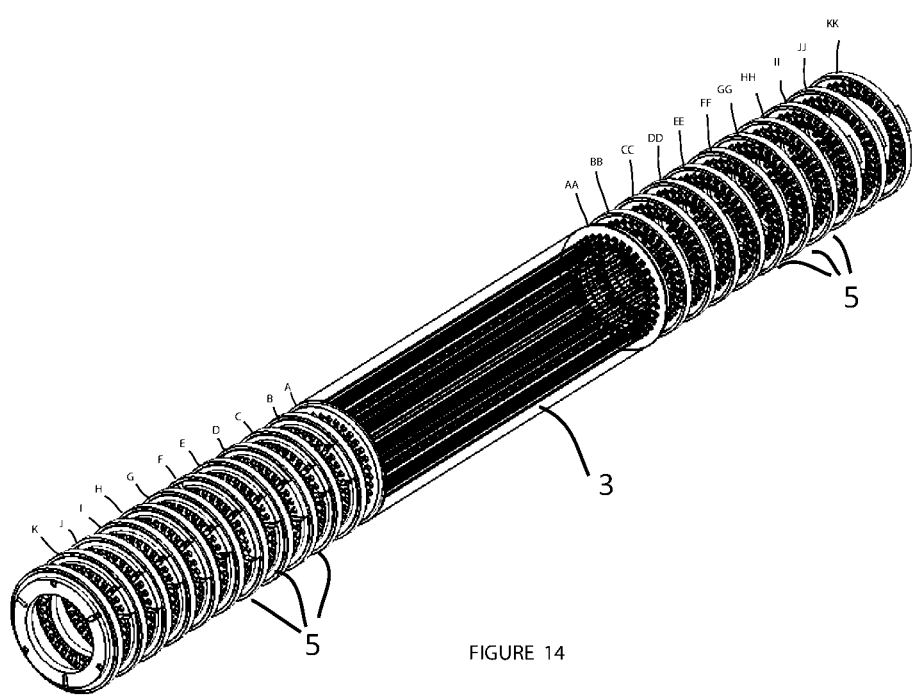
FIG. 14 is an isometric view of the stator with end turn wafers for both ends.
Figure 16:
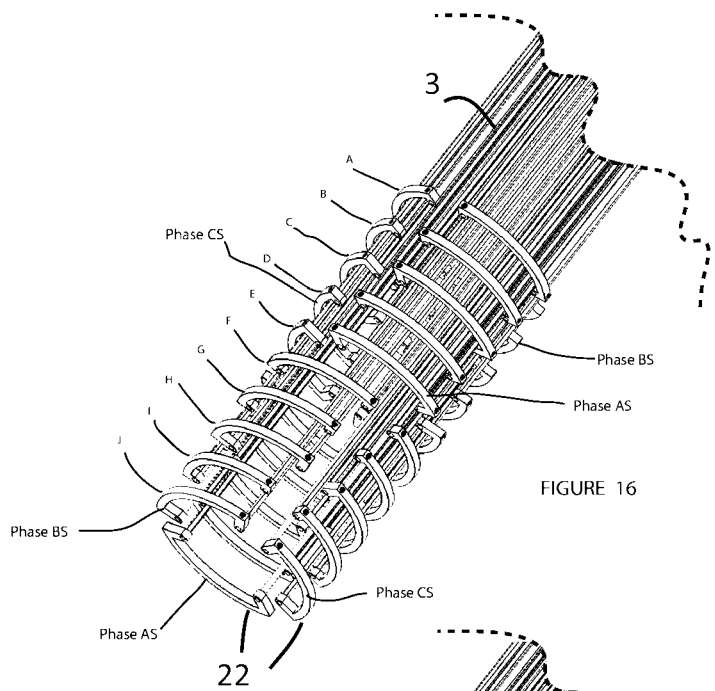
FIG. 16 is the same view as FIG. 15 with the wafers hidden to show the conductor end turns A to J
Figure 15:
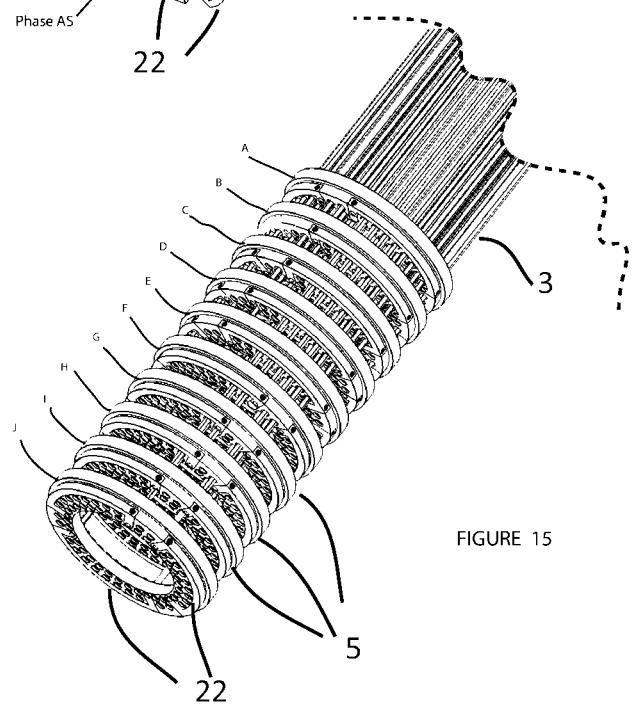
FIG. 15 is an isometric view of end turn wafers A to J
Figure 17:
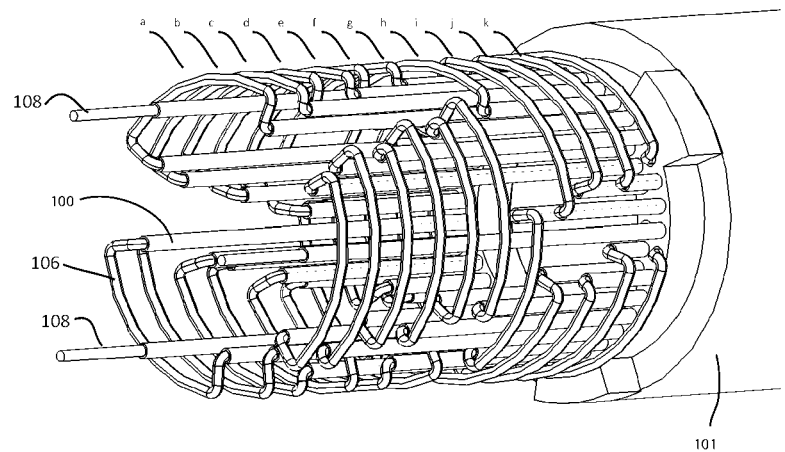
FIG. 17 is an isometric view of another embodiment of the invention of the non welded end turn end.
Figure 18:
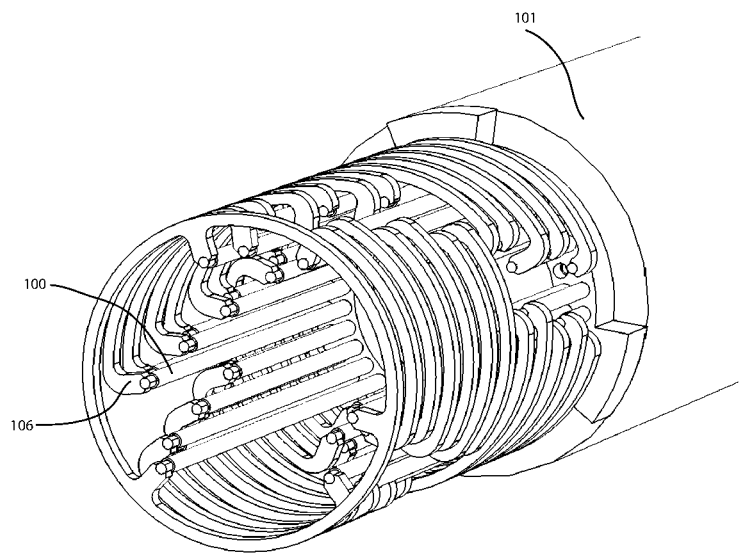
FIG. 18 is a similar view to FIG. 17 at the opposite end turn end.

Referring to FIGS. 14 to 16, there is shown an isometric view of the motor windings 3 and ceramic end turn wafers 5, it shows a very compact motor winding arrangement, again with every magnet wire passing through the motor totally isolated from any other passing through the lamination stack.

The voids can be filled with high temperature dielectric oil, or filled using magnesium oxide or a liquid ceramic paste such as Rescor castable ceramics available from www.contronics.com.

Referring to FIGS. 17 to 21 there is shown a further embodiment of the invention, in this example the ceramic tubes 100 housing conductors 108, which extend through the lamination stack 101 and are cut to different lengths corresponding to the end turn layers a to k.

Figure 19:
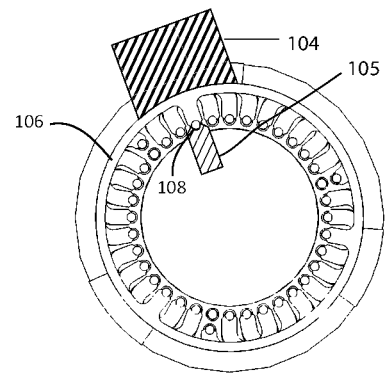
FIG. 19 is end on view of the end turn shown in FIG. 18, with an ultrasonic welding tool being used.
Figure 20A:
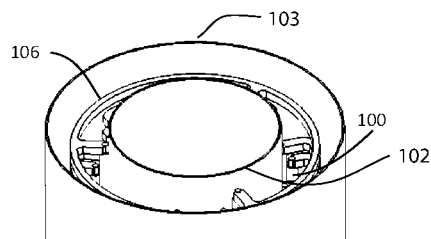
FIG. 20 is a similar view to FIG. 19 with an inner and outer sleeve around the end turns.
Figure 20B:
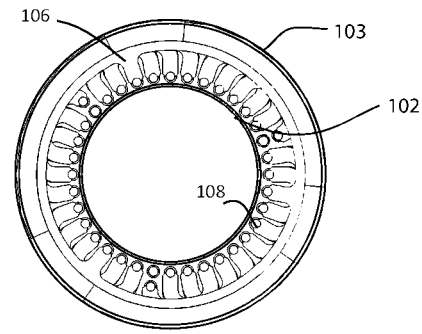
Figure 21:
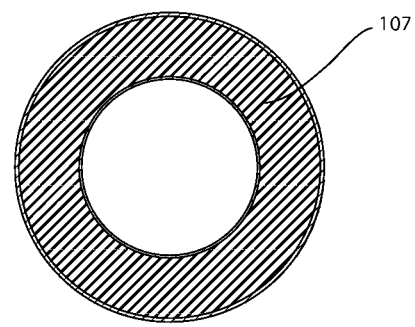
FIG. 21 is a similar view to FIG. 20 with the end turns potted with a cold cured ceramic potting material, the potting material contained between the inner and outer sleeve.

In this embodiment there are no end turn wafers. Curved ceramic link pieces 106, comprising a shaped ceramic shell enclosing a conductive core, are used to connect two conductors 108 for each new end turn, the ceramic shell of the link piece 106 abutting the ends of the ceramic tubes 100. Referring to FIG. 19, the conductors 108 are then ultrasonically welded using an anvil 104 and vibrating head or sonotrode (also known as a horn) 105. This method reliably and cleanly achieves an excellent electrical connection.

Once the conductors 108 are fully wired to create the winding circuits, an inner sleeve 102 and outer sleeve 103 are placed around the end turns (that it, the curved link pieces 106 and the exposed ends of the ceramic tubes 100) and a castable ceramic potting material 107 is poured around all the end turns and between the inner and outer sleeve to fully encapsulating the end turn assembly.

The use of ceramics for the end turn wafers, insulating tubes for the longitudinal conductors, and link pieces, in both the embodiments, is particularly suitable for their insulating and temperature resistant properties. Nevertheless, other materials, such as composite materials and polymers, may also be suitable, provided they adequate provide insulating and temperature resistant properties, either for the tubes holding the axial conductors, or for the end wafers. Both components may be formed by injection moulding.

The end turn wafers could also be formed with the curved conductors pre-assembled with the wafers. Each wafer and set of conductors for that wafer could be formed using a printed circuit board. The end turn conductors of the circuits boards may be braze together for electrical and mechanical connection once assembled.

Each axial conductor located in an insulating tube could be made up of one or more strands or wires, and they may be braided or disposed separately. Provided they carry they are at the same voltage, tracking between them is not an issue.

The invention claimed is:

1. A stator having a field winding, the winding comprising a plurality of axial conductors connected at their ends to form at least one circuit with a number of turns, each axial conductor being disposed within a tubular axial insulation member, the tubular axial insulation members being disposed within and running the full length of a stack of laminations, the axial conductors being joined in pairs by a connection at their ends to form at least one circuit with a number of turns, the connection between pairs of the axial conductors being provided by a plurality of wafers formed of insulating material, each wafer having a passage for a conductor path provided to connect one or more pairs of axial conductors.

2. A stator according to claim 1 wherein the axial conductors and the tubular insulation members are radially distributed at equal angles.

3. A stator according to claim 1 wherein the position of the axial conductors and the tubular insulation members is predetermined.

4. A stator according to claim 1 wherein the axial conductors are arranged in more than one power phase, each conductor of each phase are separated by at least 1mm of geometric distance at an end turn region.

5. A stator according to claim 1 wherein the axial conductors and the tubular insulation members are arranged in concentric circles.

6. A stator according to claim 1 wherein a through bore is provided along the central axis.

7. A stator according to claim 1 wherein the axial conductors being joined in pairs by a connection at their ends to form at least one circuit with a number of turns, the connection between pairs of the axial conductors being provided by shaped conductor members, with potting material being provided around the shaped conductor members.

8. A stator according to claim 1 wherein the axial conductors and end turns are formed from a continuous conductor threaded through the stator.

9. A stator according to claim 1 wherein the axial conductors and end turns are welded together.

10. A stator according to claim 1 wherein the axial conductors and/or end turns are braided wire.

11. A stator according to claim 1 wherein the axial conductors and/or conductive end turn paths are copper clad steel.

12. A stator having a field winding, the winding comprising a plurality of axial conductors connected at their ends to form at least one circuit with a number of turns, the axial conductors being joined in pairs by a connection at their ends to form at least one circuit with a number of turns, the connection between pairs of the axial conductors being provided by a plurality of wafers formed of insulating material, each wafer having end turns provided to connect one or more pairs of axial conductors.

13. A stator according to claim 12 wherein the axial conductors and end turns are formed from a continuous conductor threaded through the stator.

14. A stator according to claim 12 wherein each wafer includes an arcuate channel to accommodate the end turns.

15. A stator according to claim 12 wherein the conductive path is provided by a rigid arcuate conductor.

16. A stator according to claim 12 wherein the axial conductors and conductive end turn paths are welded together.

17. A stator according to claim 12 wherein the axial conductors and/or conductive end turn paths are braided wire.

18. A stator according to claim 12 wherein the axial conductors and/or conductive end turn paths are copper clad steel.

19. A stator having a field winding, the winding comprising a plurality of axial conductors connected at their ends to form at least one circuit with a number of turns, the axial conductors being joined in pairs by a connection at their ends to form at least one circuit with a number of turns, the connection between pairs of the axial conductors being provided by shaped conductor members, with potting material being provided around the shaped conductor members.

* * * * *